US012010763B2

(12) United States Patent
Gebremedhin et al.

(10) Patent No.: US 12,010,763 B2
(45) Date of Patent: Jun. 11, 2024

(54) METHOD FOR ESTABLISHING RELAY CONNECTIVITY IN ETSI SMARTBAN

(71) Applicant: University of Oulu, University of Oulu (FI)

(72) Inventors: Berhane Gebremedhin, University of Oulu (FI); Tuomas Paso, Univeristy of Oulu (FI); Jussi Haapola, University of Oulu (FI)

(73) Assignee: UNIVERSITY OF OULU, Oulu (FI)

( * ) Notice: Subject to any disclaimer, the term of this patent is extended or adjusted under 35 U.S.C. 154(b) by 192 days.

(21) Appl. No.: 17/096,037

(22) Filed: Nov. 12, 2020

(65) Prior Publication Data
US 2021/0144804 A1    May 13, 2021

(30) Foreign Application Priority Data

Nov. 13, 2019   (FI) ..................... 20195968

(51) Int. Cl.
| H04W 88/04 | (2009.01) |
| H04L 5/00  | (2006.01) |
| H04W 16/18 | (2009.01) |
| H04W 84/12 | (2009.01) |
| H04W 84/18 | (2009.01) |

(52) U.S. Cl.
CPC .......... *H04W 88/04* (2013.01); *H04L 5/0055* (2013.01); *H04W 16/18* (2013.01); *H04W 84/12* (2013.01); *H04W 84/18* (2013.01)

(58) Field of Classification Search
CPC ..... H04W 88/04; H04W 84/12; H04W 76/19; H04B 7/15507; H04B 7/15542; H04L 5/0055
See application file for complete search history.

(56) References Cited

U.S. PATENT DOCUMENTS

| 7,486,632 B2 | 2/2009 | Ookuma |
| 8,750,305 B2 | 6/2014 | Ho |

(Continued)

FOREIGN PATENT DOCUMENTS

| CN | 113423101 A | * | 9/2021 |
| EP | 3481093 |  | 5/2019 |

(Continued)

OTHER PUBLICATIONS

Ahmed Ragab Elsherif, Interference Management and Resource Allocation in Heterogeneous Wireless Networks, University of California Davis, 2014, 257 pages (Year: 2014).*

(Continued)

*Primary Examiner* — Yu-Wen Chang
(74) *Attorney, Agent, or Firm* — Thomas |0 Horsetemeyer, LLP

(57) ABSTRACT

The present invention discloses a mechanism to initiate, establish, and maintain relay connectivity in a SmartBAN network while maintaining uninterrupted operations within the network. The present invention comprises the aspects of identifying and notifying an isolated node, initiating and establishing relay connectivity, maintaining the relay connectivity, and ending the relay connectivity when this is desired by either a hub, the isolated node or the nominated relay node. Some new frame formats comprising several new Information Units are also defined.

19 Claims, 11 Drawing Sheets

(56) References Cited

U.S. PATENT DOCUMENTS

| | | | |
|---|---|---|---|
| 2006/0153132 A1* | 7/2006 | Saito | H04W 74/06 370/329 |
| 2008/0002631 A1* | 1/2008 | Ramachandran | H04B 7/2606 370/338 |
| 2008/0108355 A1* | 5/2008 | Oleszcsuk | H04W 72/1263 455/442 |
| 2008/0130550 A1* | 6/2008 | Kim | H04B 7/155 370/315 |
| 2008/0219202 A1* | 9/2008 | Pandey | H04W 16/26 370/315 |
| 2009/0073915 A1* | 3/2009 | Zhang | H04B 7/2606 370/315 |
| 2013/0171986 A1* | 7/2013 | Shimizu | H04W 76/19 455/423 |
| 2016/0174270 A1* | 6/2016 | Jeong | H04L 1/1685 370/315 |
| 2018/0109308 A1* | 4/2018 | Leroux | H04L 67/52 |
| 2019/0335378 A1* | 10/2019 | Parangattil | H04W 4/80 |
| 2020/0068578 A1* | 2/2020 | Lee | H04B 7/15507 |
| 2020/0100208 A1* | 3/2020 | Vaidya | H04W 68/02 |
| 2021/0006412 A1* | 1/2021 | Gahlinger | H04W 8/22 |
| 2021/0067301 A1* | 3/2021 | Luo | H04W 24/10 |

FOREIGN PATENT DOCUMENTS

| | | | |
|---|---|---|---|
| JP | 5272536 B2 * | 8/2013 | |
| JP | 7035599 B2 * | 3/2022 | |
| KR | 20150007254 A * | 6/2016 | |
| WO | WO-2011090013 A1 * | 7/2011 | |
| WO | WO-2014084665 A1 * | 6/2014 | |

OTHER PUBLICATIONS

A relay selection scheme to prolong connection time for public safety communications, Huang et al., IEEE Xplore (Year: 2018).*
ETSI TS 103 325 V1.1.1(Apr. 2015) Smart Body Area Network (SmartBAN); Low Complexity Medium Access Control (MAC) for SmartBAN, Jul. 23, 2018.
Paso, T., University of Oulu TC SmartBAN: Low Complexity Medium 1-20Access Control (MAC) for SmartBAN, May 23, 2019.
ETSI TS 103 327 V1.1.1 (Apr. 2019) Smart Body Area Networks(SmartBAN) Service and application standardized enablers and interfaces, APIs and infrastructure for interoperability management.
Khan R. et al. Throughput and Channel Aware MAC Scheduling for SmartBAN 1-20 Standard. IEEE, USA: IEEE Access, May 10, 2019, vol. 7, pp. 63133-63145.
Finnish Search Report for Application No. 20195968 dated May 22, 2020.
Pan Rui et al: "An Opportunistic Relay Protocol With Dynamic Scheduling in Wireless Body Area Sensor Network", IEEE Sensors Journal, IEEE Service Center, New York, NY, US, vol. 15, No. 7, Jul. 1, 2015 (Jul. 1, 2015), pp. 3743-3750, XP011581163, ISSN: 1530-437X, DOI: 10.1109/JSEN.2015.2400052 [retrieved on May 12, 2015].
European Search Report for Application EP20205734 dated Apr. 7, 2021.

* cited by examiner

Table 1

| Frame type | Field Value |
|---|---|
| Management | 00 |
| Control | 01 |
| Data | 10 |
| General purpose | 11 |

FIG. 7

Table 2

| Frame type | Field value | Frame subtype | Field value |
|---|---|---|---|
| Management | 00 | Beacon | 000 |
| Management | 00 | Connection Request | 001 |
| Management | 00 | Connection Assignment | 010 |
| Management | 00 | Slot Reassignment | 011 |
| Management | 00 | Disconnection Request | 100 |
| Management | 00 | Disconnection Response | 101 |
| Management | 00 | Inter HUB | 110 |
| Control | 01 | ACK | 000 |
| Control | 01 | NACK | 001 |
| Data | 10 | User Priority 0 | 000 |
| Data | 10 | User Priority 1 | 001 |
| Data | 10 | User Priority 2 | 010 |
| Data | 10 | User Priority 3 | 011 |
| Data | 10 | Inter HUB | 100 |
| General purpose | 11 | Relay Connection | 000 |

FIG. 8

Table 3

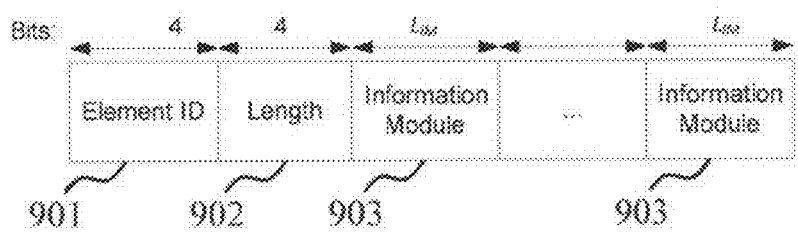

FIG. 9

Table 4

| Element ID | Operation | Notation | Description |
|---|---|---|---|
| 0000 | Isolated Node Notification | I-Notif | The way an isolated node notifies to the WBAN about its new status |
| 0001 | Node Status Request | N-Sreq | Explains the node status requirement when a certain node does not transmit in its scheduled slots |
| 0010 | Isolated Node Notification Listen | I-Listen | Explains the command details given to the nodes to start listening Isolated Node Notifications |
| 0011 | Relay Nomination | R-Nom | Explains the details about the R-Beacon transmission period |
| 0100 | Proposed Relay Link Status | R-Status | Explains if the proposed relay link is successful/unsuccessful |
| 0101 | Stop Isolated Node Listening | S-Listen | Explains the command details given to the nodes to stop listening Isolated Node Notifications |
| 0110 | Relay Connection | R-Conn | Describes the details of the relay connection |
| 0111 | Isolated Node Slot Reassignment Ack | I-SAck | Acknowledgement by the isolated node for the new slot allocations |
| 1000 | Relay Disconnection Request | R-Dreq | Explains the requirement for a relay disconnection |
| 1001 | Relay Beacon | R-Beacon | Explains the beacon frame transmitted from a Relay to an isolated node |

FIG. 10

Table 5

| Type | Number of bits | Subfields | Number of bits |
|---|---|---|---|
| Isolated Node Notification | ≥ 8 | Isolated Node ID | 8 |

FIG. 11

Table 6

| Type | Number of bits | Subfields | Number of bits |
|---|---|---|---|
| Node Status Request | 0 | null | 0 |

FIG. 12

Table 7

| Type | Number of bits | Subfields | Number of bits |
|---|---|---|---|
| Isolated Node Notification Listen | ≥ 24 | Node ID | 8 |
| | | Listen Start Timing | 8 |
| | | Listen End timing | 8 |

FIG. 13

Table 8

| Type | Number of bits | Subfields | Number of bits |
|---|---|---|---|
| Relay Nomination | ≥ 16 | Isolated Node ID | 8 |
| | | R-Beacon Start Timing | 8 |

FIG. 14

Table 9

| Type | Number of bits | Subfields | Number of bits |
|---|---|---|---|
| Proposed Relay Link Status | ≥ 8 | Relay Link Status | 1 |
| | | Reserved | 7 |

FIG. 15

Table 10

| b8 | b7 | b6 | b5 | b4 | b3 | b2 | b1 |
|---|---|---|---|---|---|---|---|
| x | x | x | x | x | x | x | Relay Link Status |

FIG. 16

Table 11

| Type | Number of bits | Subfields | Number of bits |
|---|---|---|---|
| Stop Isolated Node Listening | ≥ 16 | Node ID | 8 |
| | | Stop Listening Timing | 8 |

FIG. 17

Table 12

| Type | Number of bits | Subfields | Number of bits |
|---|---|---|---|
| Slot Reassignment | 32 | Node ID | 8 |
| | | Start Slot | 10 |
| | | End Slot | 10 |
| | | Reserved | 4 |

FIG. 18

Table 13

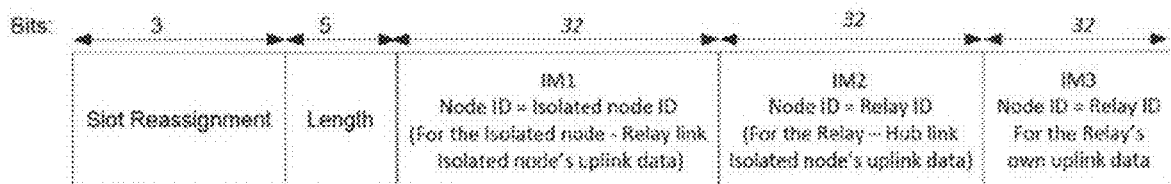

FIG. 19

Table 14

| Type | Number of bits | Subfields | Number of bits |
|---|---|---|---|
| Relay Connection | ≥ 16 | Isolated Node ID | 8 |
| | | Relay Start Timing | 8 |

FIG. 20

Table 15

| Type | Number of bits | Subfields | Number of bits |
|---|---|---|---|
| Isolated Node Slot Reassignment Ack | 8 | Slot Reassignment | 1 |
| | | Reserved | 7 |

FIG. 21

Table 16

| b8 | b7 | b6 | b5 | b4 | b3 | b2 | b1 |
|---|---|---|---|---|---|---|---|
| x | x | x | x | x | x | x | Slot Reassignment |

FIG. 22

Table 17

| Type | Number of bits | Subfields | Number of bits |
|---|---|---|---|
| Relay Disconnection Request | 8 | Reason | 8 |

FIG. 23

Table 18

| Bits (8) | Reason for a relay disconnection |
|---|---|
| 00000000 | Isolated node wants to switch to normal connectivity |
| 00000001 | Stop operation |
| 00000010 | Insufficient resources |
| 00000011 | Unknown |
| 00000100 ... 11111111 | Reserved |

FIG. 24

METHOD FOR ESTABLISHING RELAY CONNECTIVITY IN ETSI SMARTBAN

CROSS-REFERENCE TO RELATION APPLICATION(S)

This application claims priority to FINNISH patent application having serial no. 20195968, filed on Nov. 13, 2019, which is herein incorporated by reference in its entirety.

TECHNICAL FIELD

The present invention relates to Wireless Body Area Networks (WBANs) which are defined by IEEE (The Institute of Electrical and Electronics Engineers) standard 802.15.6 and ETSI (The European Telecommunications Standards Institute) technical committee (TC) "SmartBAN" (i.e. Smart Body Area Network) specifications of the physical layer (PHY) and medium access control (MAC) for packet-based short-range communications.

BACKGROUND

The IEEE standard 802.15.6 and the ETSI technical committee "SmartBAN" define physical layer and medium access control specifications for packet-based short-range communications in Wireless Body Area Networks (WBANs). WBANs target e.g. medical and healthcare monitoring systems in the vicinity of a human body, or inside the human body.

Standard [1], i.e. IEEE standard 802.15.6-2012, "IEEE Standard for Local and metropolitan area networks—Part 15.6: Wireless Body Area Networks", IEEE Computer Society, LAN/MAN Standards Committee, Feb. 29, 2012 discloses a standard for short-range, wireless communication in the vicinity of, or inside, a human body (but not limited to humans). The communication networks use existing industrial-scientific-medical (ISM) frequency bands as well as bands approved by national medical and/or regulatory authorities. MAC frame formats, MAC functions, security services, and physical layer specifications are discussed in this standard covering Wireless Body Area Networks.

Standard [2], i.e. Smart Body Area Network (SmartBAN), "Enhanced Ultra-Low Power Physical Layer", ETSI TS 103 326 V1.1.1, April 2015 discloses ETSI specifications for ultra-low power physical layer of the SmartBANs. It further applies to short-range, wireless communication between wearable sensors or devices and the hub coordinator, and it specifies the physical layer for transmitting on the medium. Packet formats, modulation and forward error correction (FEC) algorithms are discussed.

Standard [3], i.e. Smart Body Area Network (SmartBAN), "Low Complexity Medium Access Control (MAC) for SmartBAN", ETSI TS 103 325 V1.1.1, April 2015 discloses the MAC protocol specification designed to facilitate spectrum sharing with other devices. It comprises channel structure, MAC frame formats and MAC functions and the operative frequency band is the ISM frequency band from 2.4 GHz to 2.4835 GHz.

Due to various reasons (such as node location or transmit power), a certain node can be out of the reach of its Hub, i.e. the node becomes isolated. In such a scenario, the isolated node shall use a relay connection if it is willing to reconnect to its parent WBAN. Neither the forementioned IEEE [1] nor the ETSI standards [2], [3] provide a solution for detecting an isolated node and establishing a relay connection from the isolated node to the WBAN Hub using the same standard specifications in a situation, where the Hub cannot maintain a direct one-hop connection with the isolated node.

The SmartBAN supports a one-hop star topology enabling a direct communication between the nodes and the Hub. However, it does not have MAC features which support relay capability. In the IEEE 802.15.6 standard, all nodes and the Hub are organized into either a one-hop star WBAN or a two-hop extended star WBAN. In the one-hop star WBAN, the nodes and the Hub communicate directly. No relay capability is supported. Whereas, in the two-hop extended star WBAN, the network supports a relay connectivity i.e., a node and the Hub can optionally communicate via a relaying node. In this type of relay connectivity, the relayed node is not an isolated node, rather it is a node seeking an optional link to the Hub. The two-hop extension can be initiated by either side at a convenient time of the initiator. The relaying node is selected by both the Hub and the relayed node via prearrangements. The relayed node heavily depends on the quality of the two-hop links in selecting the relaying node. In short, this type of a relay method is optional, applies complex communication procedure, and it is not intended to support a relay connectivity for isolated nodes. These are the drawbacks in the background art.

Patent publication "Ookuma"; U.S. Pat. No. 7,486,632; i.e. reference [4], tries to solve the isolated node problem by installing an external relay node to act as a route between the base station and the isolated node in a wireless multi-hop network. Here, a method of selecting a relay node installation point from among predetermined relay node installation point candidates is proposed. Ookuma also defines a method to differentiate an isolated node from a connected node in the network. Ookuma especially relates to initiation of a network, where a relay node is to be installed in a wireless multi-hop network. Thus, the situation is different than what is the basis i.e. the starting point for the present invention. In [4], even though it has a method of identifying isolated nodes and hence is capable of establishing a relay connectivity in the network, it depends on external relay nodes for the routing purpose. It does not support relay connectivity by using existing network resources.

There are other kinds of wireless sensor networks presented in references [5]-[8]:

[5]: H. Y. Chang, S. C. Huang, C. C. Lai and Z. H. Hong, "A Novel Recommendation Scheme for Increasing Connectivity in ZigBee Wireless Sensor Networks," 2014 Tenth International Conference on Intelligent Information Hiding and Multimedia Signal Processing, Kitakyushu, 2014, pp. 674-677. Reference [5] discloses a scheme for increasing connectivity in ZigBee wireless sensor networks. ZigBee applies IEEE 802.15.4 standard. Reference [5] seems to have a multi-hop possibility, the child node being even three hops from the coordinator (hub). Their network area in the experimental tests is 100 m*100 m, clearly out from the SmartBAN application area's respective ranges.

[6]: S. Maheswararajah, S. K. Halgamuge, K. B. Dassanayake and D. Chapman, "Management of Orphaned-Nodes in Wireless Sensor Networks for Smart Irrigation Systems," in IEEE Transactions on Signal Processing, vol. 59, no. 10, pp. 4909-4922, October 2011.

[7]: X. Yang, Y. Xu and S. Qiu, "A Solution of Orphan Problem in ZigBee Tree Network," 2011 7th International Conference on Wireless Communications, Networking and Mobile Computing, Wuhan, 2011, pp. 1-4. Reference [7] concerns also an orphan node problem in a ZigBee Tree network. This relates to a new node trying to join the network, and if a possible parent has already reached its maximum child nodes, the connection will fail and an orphan node will emerge.

[8]: S. Sapre and S. Mini, "Relay node placement to establish full connectivity in directional sensor networks," 2017 Fourteenth International Conference on Wireless and Optical Communications Networks (WOCN), Mumbai, 2017, pp. 1-5. Reference [8] discloses relay node placement to establish full connectivity in Directional Sensor Networks. In [8], all the sensor nodes are connected to a data sink node using the least number of relay nodes. It seems that BANs can be considered as a sub-group to Wireless Sensor Networks (WSN). In the end of the introductory part of [8], it says that it considers the problem of placement or relay nodes in a given directional WSN. Also, an algorithm for improving the connectivity of the network is presented. They want to deploy a fully connected network where all the sensors deployed can maintain communication with a predefined data sink node (i.e. the base station or a hub).

In references [5], [6], and [7], relay devices are intentionally installed to increase connectivity in the network. In reference [8], relay devices are intentionally installed to establish full connectivity in the network. However, neither of [5]-[8] provides an isolated node discovery and reconnection solutions.

Patent publication "Ho"/U.S. Pat. No. 8,750,305; i.e. reference [9]; discloses a two-hop star network topology extension. Ho describes a method for relaying frames in such a network, where a first encapsulating frame having a payload is formatted as a one-hop communication between a relayed node and a relaying node. Then the relaying node generates a second encapsulating frame having the above payload, and this frame is formatted as a one-hop communication from the relaying node to the target hub. Frames can also be sent back from the target hub via the relaying node to the relayed node. There is also logic where an acknowledgement by the relaying node (in response to the $1^{st}$ encapsulating frame) is monitored; in case of no acknowledgement, the $1^{st}$ encapsulating frame is re-broadcast for a number of re-tries using a certain (i.e. a second) contention probability.

IEEE 802.15.6 standard [1] defines the two-hop extended star WBAN to provide optional links for nodes experiencing low quality links with the Hub. The drawback of this solution is that it does not address for isolated nodes. It does not have features which enable isolated node discovery, it instead applies complex MAC procedures to establish and to manage the communication in the two-hop links.

Currently, the SmartBAN standard [2], [3] does not have a solution or a mechanism that supports relay capability in the WBAN.

In general, there are no existing methods in any of the references [4]-[9] above, which are specifically designed to address node isolation and relay connectivity in wireless communication networks.

SUMMARY OF THE INVENTION

The present invention extends the SmartBAN standard [3] by defining novel MAC specifications, which provide a SmartBAN compliant mechanism to initiate, establish, and maintain relay connectivity in a SmartBAN network while maintaining uninterrupted operations within the network. The presented mechanism is further applicable to other star topology-based wireless communication networks. Furthermore, the present invention is backward-compatible, i.e., communication systems and devices (i.e. "nodes") implemented using the existing SmartBAN standard will operate as nowadays, whereas networks implemented according to the amendment in the standard can utilize the proposed functionality according to the present invention.

It can be said that the present invention enables a relay functionality in the existing ETSI SmartBAN standard, through defining certain MAC (i.e. Medium Access Control) specifications.

Major changes on the existing SmartBAN MAC specifications required to enable relay connectivity between a Hub and an isolated node comprise:

Isolated node identification and notification
  A connected node becomes isolated when it does not have direct communications with the Hub anymore.
  The isolated node starts broadcasting Isolated Node Notifications to the network.

Initiating and establishing relay connectivity
  The Hub requests for a node status when a node fails to send a frame during its allocated time slot for the $n^{th}$ consecutive inter-beacon interval (i.e. IBI).
  The Hub commands all nodes to listen for Isolated Node Notifications.
  When the Hub receives at least one relayed Isolated Node Notification, it selects one among the relaying nodes to be a relay node and sends relay related information to it.
  The nominated relay node establishes a relay link with the isolated node and informs the Hub about it.
  The Hub makes required slot allocations and slot reassignments.

Maintaining relay connectivity
  In the scheduled period, the Hub consecutively allocates time slots first for the beacon transmission from the relay node to the isolated node, then time slots for the isolated node data transmission, and finally time slots for the relay node data transmission.

Ending relay connectivity
  The established relay connectivity is terminated when the link is not required any more, and the disconnection request can be initiated by the isolated node, by the relay node, or by the Hub.

Definition of new frame formats
  A new general-purpose frame type consisting of several new Information Units ("IU") is defined.

In summary, the present invention thus introduces, in its first aspect, a method for connecting an isolated node (401) or a node with a connection problem back to a connected state in a wireless network. The method is characterized in that it comprises the steps of:

determining from lack of acknowledgement for a downlink data signal sent by a hub (104, 403) that a respective node is isolated (401) or experiencing a connection problem;

broadcasting an Isolated Node Notification Listen command by the hub (104, 403) to all connected nodes;

broadcasting Isolated Node Notifications to the wireless network by the isolated node (401);

sending a received Isolated Node Notification by a candidate relay node to the hub (104, 403);

nominating a relay node (402) by the hub (104, 403) based on messages received from at least one candidate relay node;

sending slot allocation for a Relay Beacon, R-Beacon, from the hub (104, 403) to the nominated relay node (402);

acknowledging the slot allocation for the R-Beacon by the nominated relay node (402) to the hub (104, 403);

transmitting the R-Beacon by the nominated relay node (402) to the isolated node (401); and acknowledging the received R-Beacon by the isolated node (401) to the nominated relay node (402), resulting in a connection of the isolated node (401) back to the wireless network.

The present invention introduces, in its second aspect, an isolated node (401). It is characterized in that, when the isolated node (401) is determined to lack connection to a wireless network, the isolated node (401) is configured to perform the steps of:

broadcasting Isolated Node Notifications to the wireless network;

receiving a Relay Beacon, R-Beacon, from a nominated relay node (402); and acknowledging the received R-Beacon by the isolated node (401) to the nominated relay node (402), resulting in a connection of the isolated node (401) back to the wireless network.

The present invention introduces, in its third aspect, a hub (104, 403). It is characterized in that, when an isolated node (401) is determined to lack connection to a wireless network, the hub (104, 403) is configured to perform the steps of:

broadcasting an Isolated Node Notification Listen command to all connected nodes;

receiving at least one received Isolated Node Notification from at least one candidate relay node;

nominating a relay node (402) based on messages received from the at least one candidate relay node;

sending slot allocation for a Relay Beacon, R-Beacon, to the nominated relay node (402); and receiving acknowledgement of received slot allocation for the R-Beacon from the nominated relay node (402).

The present invention introduces, in its fourth aspect, a relay node. It is characterized in that, when an isolated node (401) is determined to lack connection to a wireless network, the relay node is configured to perform the steps of:

receiving an Isolated Node Notification Listen command from the hub (104, 403);

listening to broadcast Isolated Node Notifications from the isolated node (401);

sending a received Isolated Node Notification to the hub (104, 403);

receiving a nomination for a nominated relay node (402) from the hub (104, 403);

receiving slot allocation for a Relay Beacon, R-Beacon, from the hub (104, 403);

acknowledging received slot allocation for the R-Beacon to the hub (104, 403);

transmitting the R-Beacon to the isolated node (401); and receiving acknowledgement of the received R-Beacon from the isolated node (401), resulting in a connection of the isolated node (401) back to the wireless network.

The fifth and sixth aspects of the present invention are a computer program and a computer program product, respectively, which are both configured to execute the above method steps, when executed in a processor.

Various embodiments are disclosed in dependent claims, and respective parts in the detailed description.

In other words, the method according to the above disclosed principle may have other optional embodiments, disclosed in the following.

In an embodiment, the Isolated Node Notifications are broadcast in every N:th Inter-Beacon-Interval, IBI; until a response is received from a candidate relay node, wherein N is a positive integer.

In an embodiment, N is equal to five.

In an embodiment, after the isolated node (401) has acknowledged the received R-Beacon, sending a Proposed Relay Link Status, R-Status, frame from the nominated relay node (402) to the hub (104, 403); and sending a Stop Isolated Node Listening, S-Listen, command by the hub (104, 403) to all the connected nodes.

In an embodiment, after the isolated node (401) has acknowledged the received R-Beacon, stopping broadcast of the Isolated Node Notifications by the isolated node (401).

In an embodiment, after the last sending of an S-Listen command step, the hub (104, 403) sends slot reassignments for other nodes (404) of the wireless network in order to enable the nominated relay node (402) connectivity;

the hub (104, 403) sends to the nominated relay node (402) slot reassignments concerning the connection between the nominated relay node (402) and the isolated node (401) and the connection between the nominated relay node (402) and the hub (104, 403);

acknowledging by the isolated node (401) for the slot reassignments, to the nominated relay node (402); and sending the acknowledgement from the nominated relay node (402) to the hub (104, 403).

In an embodiment, if the hub (104, 403) receives an Isolated Node Notification directly from the isolated node (401), sending a D-Beacon (201) by the hub (104, 403) to the wireless network, resulting in reconnection of the isolated node (401) into the wireless network.

In an embodiment, the nomination of the relay node (402) is made by the hub (104, 403) according to a first temporally received message.

In an embodiment, a superframe structure of the slot reassignments comprise an R-Beacon period (202), isolated node time slots (203) and relay own slots (204), consecutively, all locating within a scheduled period (205) between two subsequent D-Beacons (201).

In an embodiment, relay connectivity is maintained by performing the steps of:

transmitting data, by the isolated node (401), to the nominated relay node (402) in a first group of slots during a scheduled period (205);

transmitting the received data, by the nominated relay node (402), to the hub (104, 403) in a second group of slots during the scheduled period (205); and transmitting own data of the nominated relay node (402) during relay own slots (204) within the scheduled period (205), or during a Control/Management period (206).

In an embodiment, concerning the previous embodiment, relay connectivity is further maintained by performing the step of:

transmitting data, and control and management frames, by the isolated node (401), to the nominated relay node (402) during the Control/Management period (206).

In an embodiment, relay connectivity is ended by the isolated node (401) by performing the steps of:

transmitting a Disconnection Request with a null payload frame; and acknowledging, by the nominated relay node (402), the received Disconnection Request by transmitting a Disconnection Response.

In an embodiment, relay connectivity is ended by the nominated relay node (402) by performing the steps of:

transmitting a Relay Disconnection Request, R-Dreq, to the hub (104, 403);
transmitting a Disconnection Request to the isolated node (401); and
disconnecting the relay connection.

In an embodiment, relay connectivity is ended by the hub (104, 403) by performing the steps of:
transmitting a Relay Disconnection Request, R-Dreq, to the nominated relay node (402); and
accepting, by the nominated relay node (402), the received Relay Disconnection Request.

In an embodiment, the wireless network is a Wireless Body Area Network, WBAN.

The subject-matter of the dependent claims can be applied in all six aspects of the present invention in the above.

BRIEF DESCRIPTION OF THE DRAWINGS

FIG. 7 illustrates, in Table 1, frame types in a relay-enabled SmartBAN in an embodiment, FIG. 8 illustrates, in Table 2, frame subtypes in a relay-enabled SmartBAN in an embodiment, FIG. 9 illustrates, in Table 3, structure of an Information Unit for Relay connectivity in an embodiment, FIG. 10 illustrates, in Table 4, element IDs for Relay connectivity operations in an embodiment, FIG. 11 illustrates, in Table 5, isolated node notification frame definition in an embodiment, FIG. 12 illustrates, in Table 6, Information Module ("IM") fora Node Status Request frame in an embodiment, FIG. 13 illustrates, in Table 7, Information Module of an Isolated Node Notification Listen frame in an embodiment, FIG. 14 illustrates, in Table 8, Information Module for a Relay Nomination frame in an embodiment, FIG. 15 illustrates, in Table 9, Information Module fields in a proposed Relay Link Status frame in an embodiment, FIG. 16 illustrates, in Table 10, IM Bits layout in a Proposed Relay Link Status frame in an embodiment, FIG. 17 illustrates, in Table 11, Information Module definition for a Stop Isolated Node Listening frame in an embodiment, FIG. 18 illustrates, in Table 12, Information Module definition for a Slot Reassignment in an embodiment, FIG. 19 illustrates, in Table 13, Information Unit definition for a Slot Reassignment in a relay-enabled SmartBAN in an embodiment, FIG. 20 illustrates, in Table 14, Information Module definition for a Relay Connection frame in an embodiment, FIG. 21 illustrates, in Table 15, Information Module definition for an Isolated Node Slot Reassignment ACK frame in an embodiment, FIG. 22 illustrates, in Table 16, IM Bits layout in an Isolated Node Slot Reassignment ACK frame in an embodiment, FIG. 23 illustrates, in Table 17, Information Module of a Relay Disconnection Request frame in an embodiment, and FIG. 24 illustrates, in Table 18, list of reasons for Relay Disconnection Request in an embodiment.

DETAILED DESCRIPTION OF THE INVENTION

The present invention extends the SmartBAN standard (cited in the background) and thus, defines new features to introduce a relay functionality to the SmartBAN standard. A relay-enabled SmartBAN can establish a relay connectivity, when connected nodes become isolated from the WBAN for some reason. The present invention is backward compatible, i.e. communication systems implemented using the existing standard will operate as nowadays, whereas networks implemented according to the amendment in the standard can utilize the functionality according to the present invention.

Figure 1:
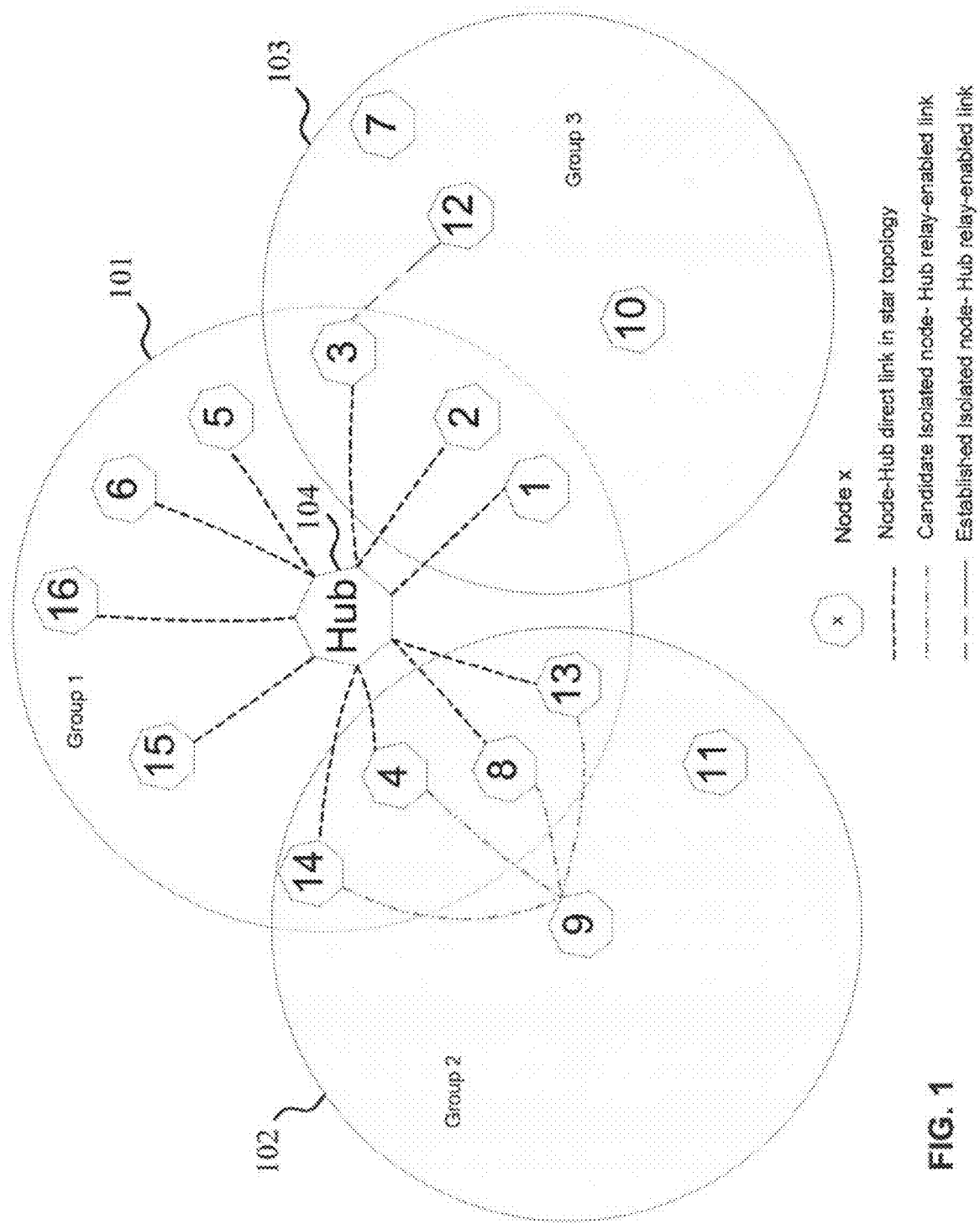
FIG. 1 illustrates a sample network topology in a relay-enabled SmartBAN, in an embodiment.

A sample network topology of a SmartBAN illustrating isolated nodes, connected nodes, and a Hub is shown in FIG. 1, as an example. In Group 1 (area 101), the Hub 104 can make a direct communication with any node located in the region of Group 1 (marked as normal dashed lines). Whereas, other nodes located outside Group 1 are beyond the reach of the Hub 104, and therefore, they are considered as isolated nodes. In such cases, the nodes can get access to the WBAN only through a relay link. Potential isolated node—Hub relay links and an established isolated node—Hub relay link are shown in Groups 2 (area 102) and 3 (area 103), respectively. In Group 2, isolated node 9 has four candidates as a relay link, namely nodes 14, 4, 8 and 13 (connections marked with dashed/dotted lines). In Group 3, there has been established an isolated node—Hub relay link so that isolated node 12 has node 3 as its relay link (the connection marked with a line with a single gap).

In the present invention, the following assumptions are considered in defining the relay functionality in SmartBAN for a group of embodiments:

Scheduled and Slotted Aloha channel access schemes are utilized. However, if SmartBAN is operating in Multi-use access mode, then Multi-use channel access is utilized.

The time slot structure defined in the SmartBAN standard for scheduled and Slotted Aloha channel access schemes is used. If SmartBAN operates in Multi-use Channel Access mode, then the time slot structure defined in the SmartBAN standard for Multi-use channel access is used.

A WBAN can support more than one relay connections at a time.

A node can serve as a relaying node only for one isolated node at a time.

To enable relay connections, dedicated time slots are allocated for the transmission of beacon information to the isolated node.

An isolated node has a Node ID and allocated network resources, i.e. it knows the superframe structure and its own time slots.

Data channel (i.e. DCH) number remains the same during the isolated node reconnection process.

Figure 2:
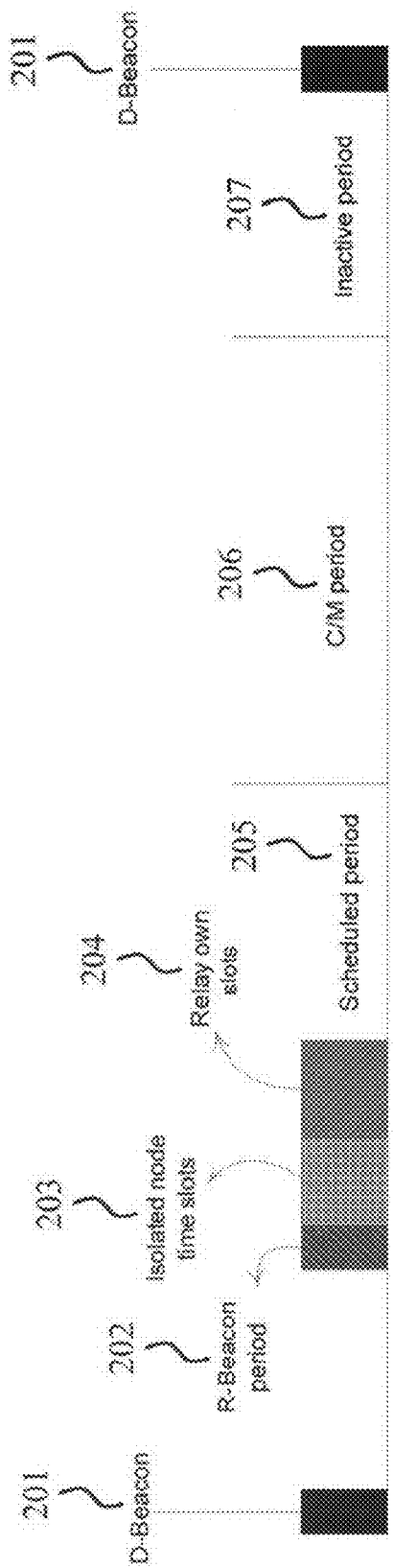
FIG. 2 illustrates a superframe structure in a relay-enabled SmartBAN illustrating time slot allocations for R-Beacon ("Relay Beacon"), Isolated node and Relay, in an embodiment.

The definitions and notations used in the disclosure, and e.g. in FIG. 2, are explained as follows:

D-Beacon ("Data Channel Beacon") 201—indicates the duration when a data beacon is transmitted.

R-Beacon period 202—indicates the duration when a relay beacon is transmitted to the isolated node.

Isolated node time slots 203—indicates the time slots allocated for the isolated node to transmit its data and the time slots allocated for the relay to transmit relayed data during the scheduled period.

Relay own slots 204—indicates the time slots allocated for the relay node to transmit its data during the scheduled period.

Scheduled period 205—indicates the period laying between the D-Beacon and the C/M (Control/Management) period during which scheduled transmissions are made.

C/M period 206—indicates the duration when control, management, or data frames can be transmitted or received by applying the Slotted Aloha channel access mechanism or the Multi-use channel access mechanism.

Inactive period 207—indicates the period during which no active transmission or reception goes on.

Relay—indicates for a relay node.

Isolated Node Notification Time—it is a parameter used to describe the maximum ("MAX") time after which the Isolated node experiences slot offset and can no longer be in synchronization with the Hub clock.

Command Ack ("Acknowledgement") bit—indicates for a field in SmartBAN in the Frame Control of a MAC Header used to acknowledge downlink ("DL") data and/or slot reassignment (i.e. "D/SR") while transmitting data during allocated time slots.

Requested Wakeup Period—it is a field in the Connection Request frame in SmartBAN used to indicate a period in which the sender node plans to wake up for reception or transmission.

In the present invention, the major changes required on the existing SmartBAN MAC standard to support the relay functionality are the following group of five features or actions, in an embodiment of the invention:

1) Isolated node identification and notification
2) Initiating and establishing relay connectivity
3) Maintaining relay connectivity
4) Ending relay connectivity, and
5) Defining new frame formats At first, an isolated node identification and notification, 1), is discussed.

A connected node becomes isolated when repeated communications failure occurs in its allocated time slots and it does not receive any ACK or NACK ("negative acknowledgement") frames from the Hub; and/or if it misses consecutive D-Beacons and C-Beacons ("Control Channel Beacon") during its Requested Wakeup Period;

and it fails to acquire the C-Beacon of its Hub after cycling between the three control channels (CCH). If the Isolated node wants to reconnect to the Hub, it shall perform the following steps in an embodiment:

It broadcasts, using its last known data channel (DCH) number, Isolated Node Notifications to the WBAN and listens actively for a response. The notification is broadcast every fifth IBI (i.e. N=5 in that example) until it receives a response from a candidate relay node. In a more general example, the notification can be broadcast in every N:th Inter-Beacon-Interval, until a response is received from a candidate relay node, wherein N is a positive integer. If it fails to receive any response from the WBAN, and if the Isolated Node Notification Time expires (when slot offset occurs), it stops broadcasting the Isolated Node Notification, and it is disconnected completely from the network.

All active nodes located nearby shall be capable of listening and relaying the Isolated Node Notification. Any active node may listen the Isolated Node Notification, but unless they are given the Isolated Node Notification Listen command from the Hub, they discard it.

Secondly, a relay connectivity initialization, from 2), is discussed.

Figure 3:
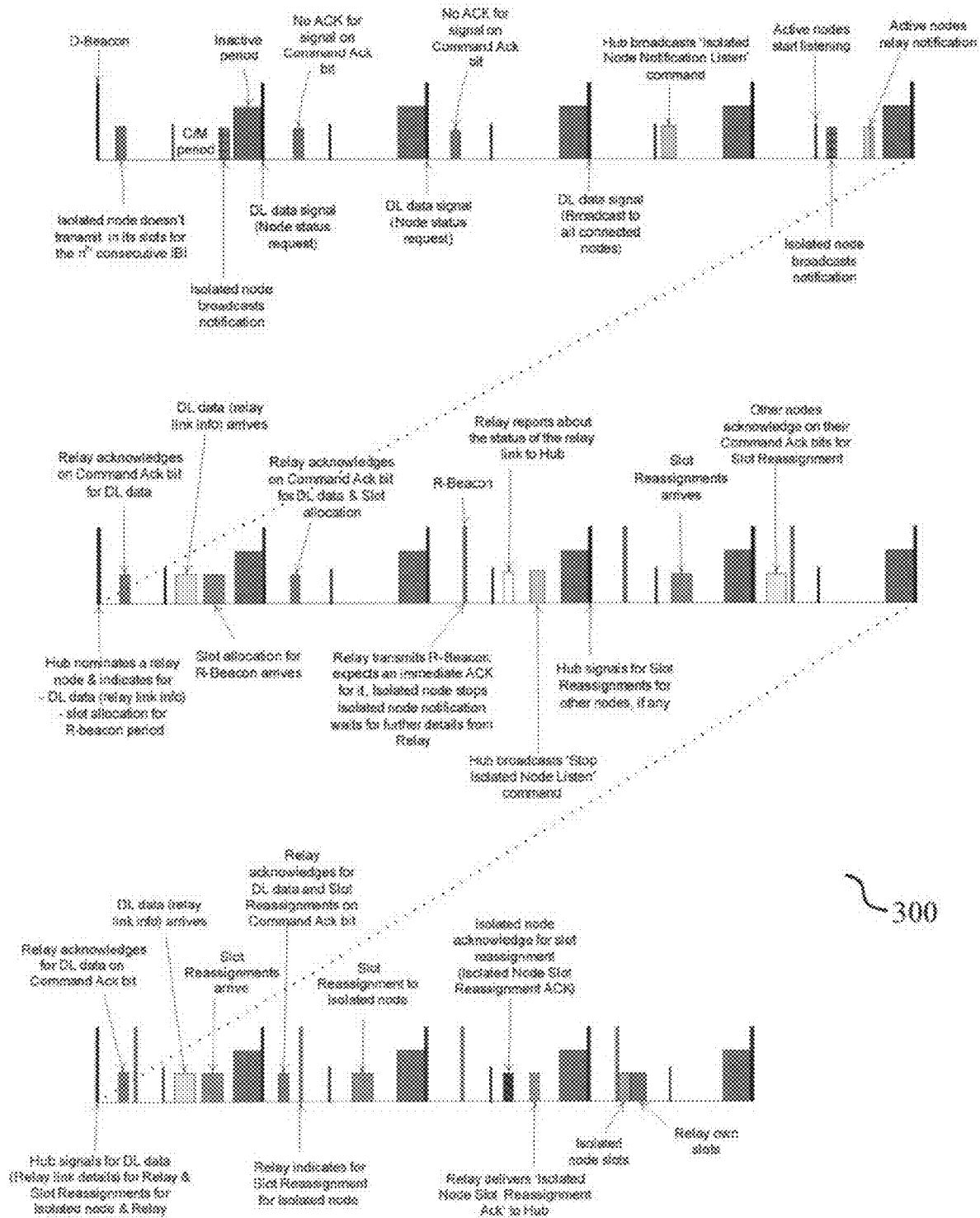
FIG. 3 illustrates relay connectivity establishment procedure in a SmartBAN, in an embodiment.
Figure 4:
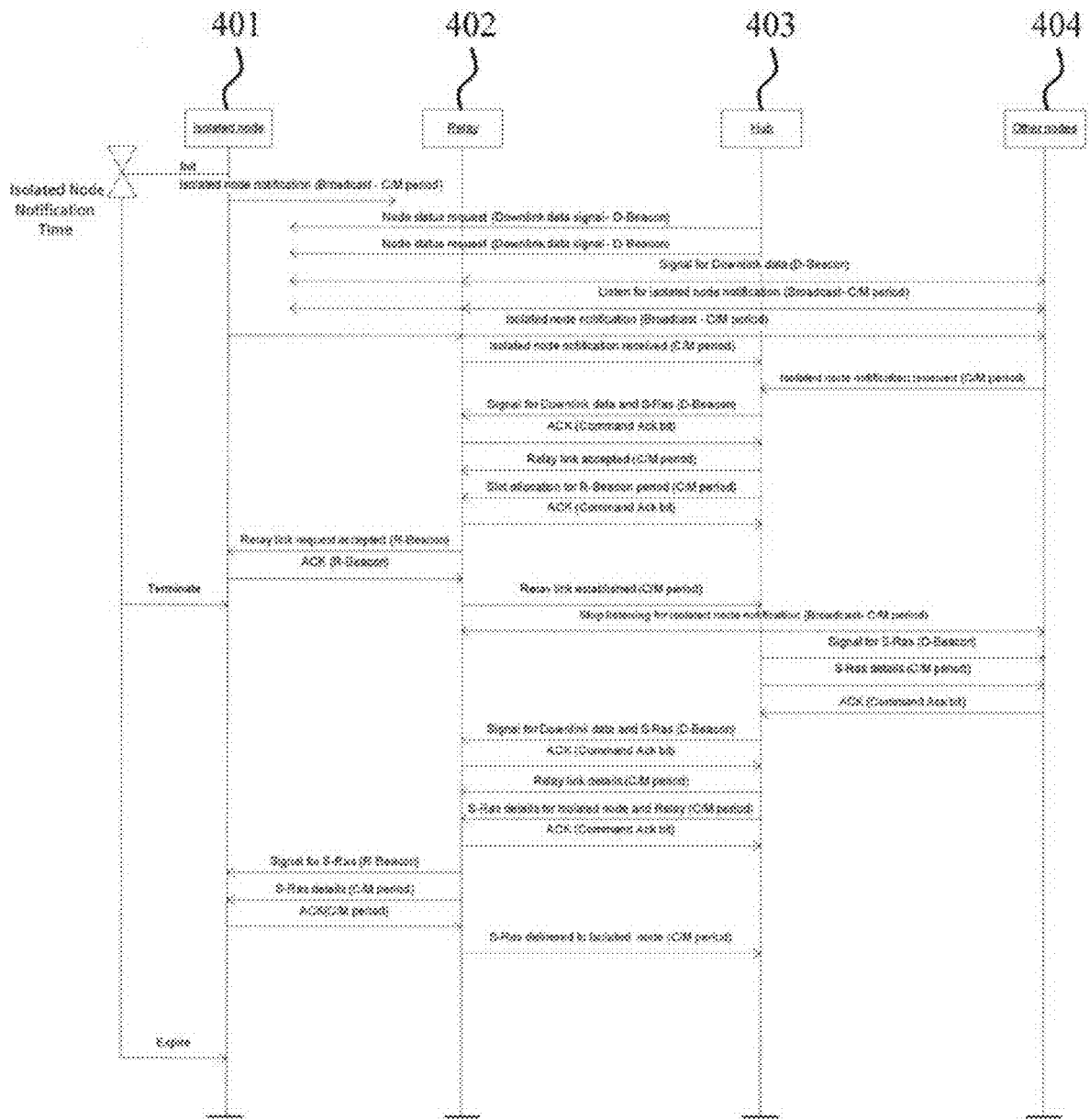
FIG. 4 illustrates relay connectivity set-up message sequence chart, in an embodiment.

Any relay connection shall be initiated with the joint effort of the Hub and the node seeking the relay connection. Each one performs certain procedures. As illustrated in FIGS. 3 and 4, the Isolated node commences broadcasting Isolated Node Notifications and the Hub performs the following steps sequentially, in an embodiment of the present invention:

1. It identifies that a certain node fails to transmit a frame during its allocated time slot for the $n^{th}$ consecutive IBI.
2. The Hub, on the D-Beacon, signals to the node for a downlink data.
3. The node, if it is not experiencing any problem, acknowledges the command while transmitting its uplink data during its allocated time slot and listens for the downlink data during the C/M Period. Then, the Hub can either transmit a Node Status Request frame in the C/M Period (not shown in FIG. 3) or ignore the remaining steps of the status request procedure.
4. If the Hub doesn't receive an acknowledgement from the node for the downlink data signal, it repeats the procedure as many times as necessary in the following D-Beacons. If the Hub still does not receive an acknowledgement from the node, it concludes that the node is experiencing a connection problem, or it is isolated.
5. The Hub, on the next D-Beacon, signals (i.e. broadcasts) to all of the connected nodes for a downlink data.
6. During the C/M period of the next IBI, the Hub broadcasts an Isolated Node Notification Listen command to the network. Once the nodes receive the command, they start listening, until further notice from the Hub, for Isolated Node Notifications from the Isolated node starting from the C/M period of the next IBI.
7. If the Hub receives the Isolated Node Notification frame, the reconnection process is made directly with it. This implies the Isolated node can receive the D-Beacon frame and gets synchronized easily. Otherwise, candidate relay nodes can forward the notification frame to the Hub in the C/M period, and they don't expect any acknowledgment for it from the Hub. To minimize the effect on the WBAN's performance (to save resources), nodes can forward the message only once during the current IBI; otherwise they discard it.
8. The Hub receives all relayed Isolated Node Notifications during the current IBI, and it performs the following steps:
   Among the candidate nodes, it nominates a node for the relay connection. This is implemented by indicating for a downlink data and for a slot reassignment to the nominated node on the D-Beacon. The indicated Slot Reassignment frame contains slot allocation details for the R-Beacon period. The R-Beacon period will be used for the Relay-to-Isolated node beacon information transmissions. The timing for the slot allocation is indicated on the D-Beacon.

In the C/M period, the Hub transmits Relay Nomination frame as a downlink data and the Slot Reassignment frame to the Relay. If the Hub is unable to deliver the frames in the current IBI, it shall attempt again in the next IBI by using the above-mentioned procedure.

9. The nominated node acknowledges the nomination and slot reassignments using the Command Ack ("Acknowledgement") bit when it transmits a frame during its own time slots.

10. On the R-Beacon period, the Relay transmits R-Beacon to the Isolated node so that it gets synchronized to the WBAN. By setting the ACK ("Acknowledgement Frame") field of the Frame Control of the R-Beacon, the Relay indicates and hence expects for an immediate acknowledgment from the Isolated node. The immediate ACK for the R-Beacon by the Isolated node helps to make sure that a successful link is created between the Relay and the Isolated node. Once the R-Beacon is acknowledged, the Isolated node stops transmitting Isolated Node Notifications to the network and waits for further details from the Relay.

11. During the same IBI, the Relay informs the Hub about the successful/unsuccessful establishment of a relay link to the Isolated node by sending the Proposed Relay Link Status frame in the C/M period.

12. After receiving the Proposed Relay Link Status frame, the Hub broadcasts a Stop Isolated Node Listening command to all nodes to stop receiving and relaying Isolated Node Notifications from the target Isolated node. In the next D-Beacon, the Hub indicates for Slot Reassignments for the other nodes in the network which need slot reassignments to enable the relay connectivity. The slot reassignment can be done in more than one IBIs if not successful in the first attempt.

13. After the slot reassignment for the other nodes is successful, the Hub signals for a downlink data (Relay Connection frame) to the Relay and slot reassignments for the Relay and Isolated node. The Relay Connection and Slot Reassignment frames are transmitted during the C/M period and acknowledged by the Relay in the next IBI while transmitting data on its time slots.

14. On the R-Beacon of the same IBI, the Relay indicates for a slot reassignment for the Isolated node. Then, the Slot Reassignment frame is transmitted during the C/M Period.

15. The Isolated node acknowledges for the slot reassignment by sending the Isolated Node Slot Reassignment ACK frame during the next IBI C/M period, and the Relay delivers the Isolated Node Slot Reassignment ACK to the Hub during the same C/M period, or during the next one if not successful.

A sample superframe structure of a relay-enabled SmartBAN showing the new time slot allocations for the R-Beacon period 202, Isolated node 203, and for the Relay 204 is shown in FIG. 2. The Hub allocates time slots for the R-Beacon period 202, Isolated node 203, and for the Relay 204 according to the order shown in FIG. 2, in an embodiment of the invention.

Figure 5:
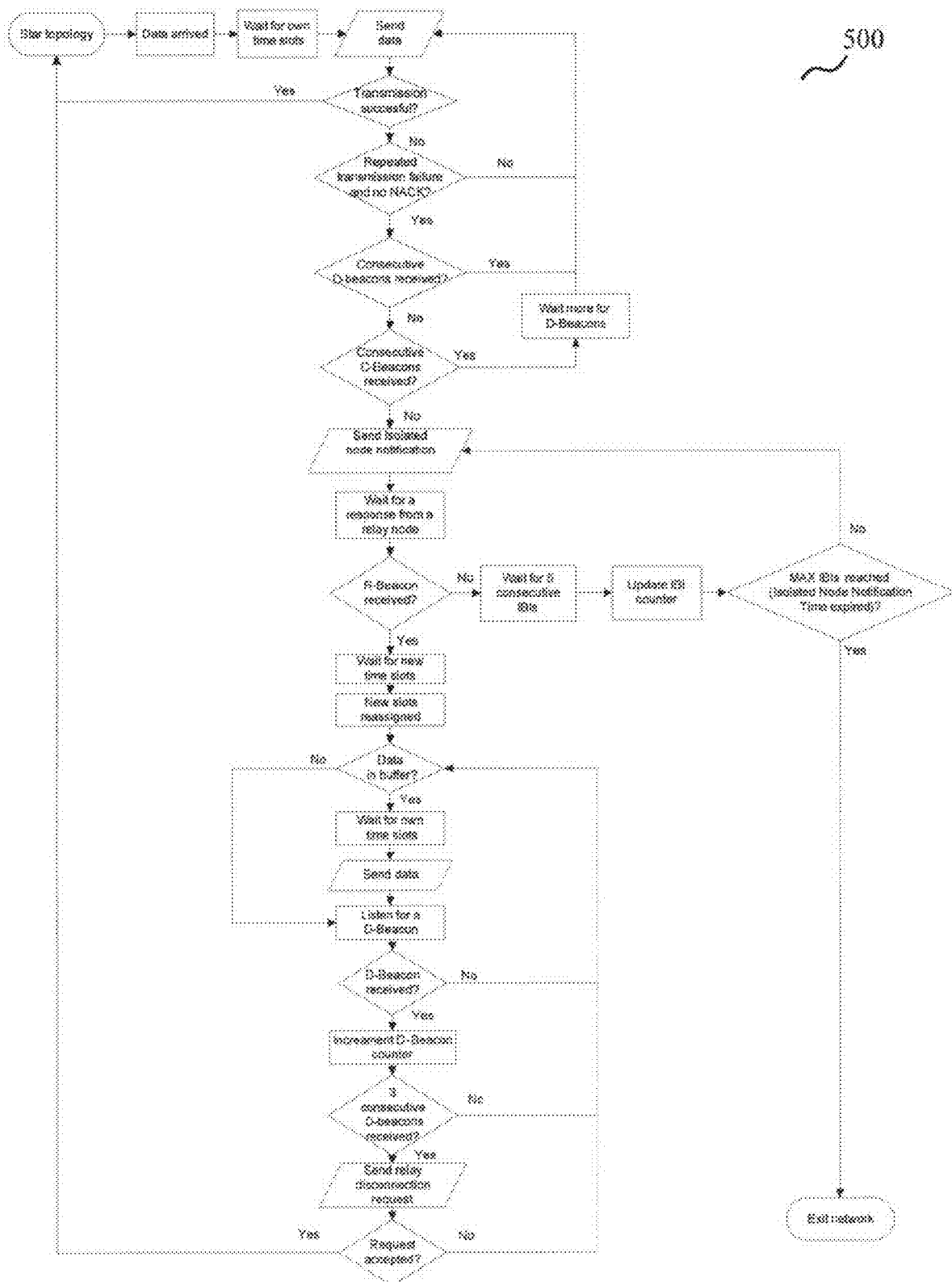
FIG. 5 illustrates relay connectivity establishment flow chart by the Isolated node, in an embodiment.
Figure 6:
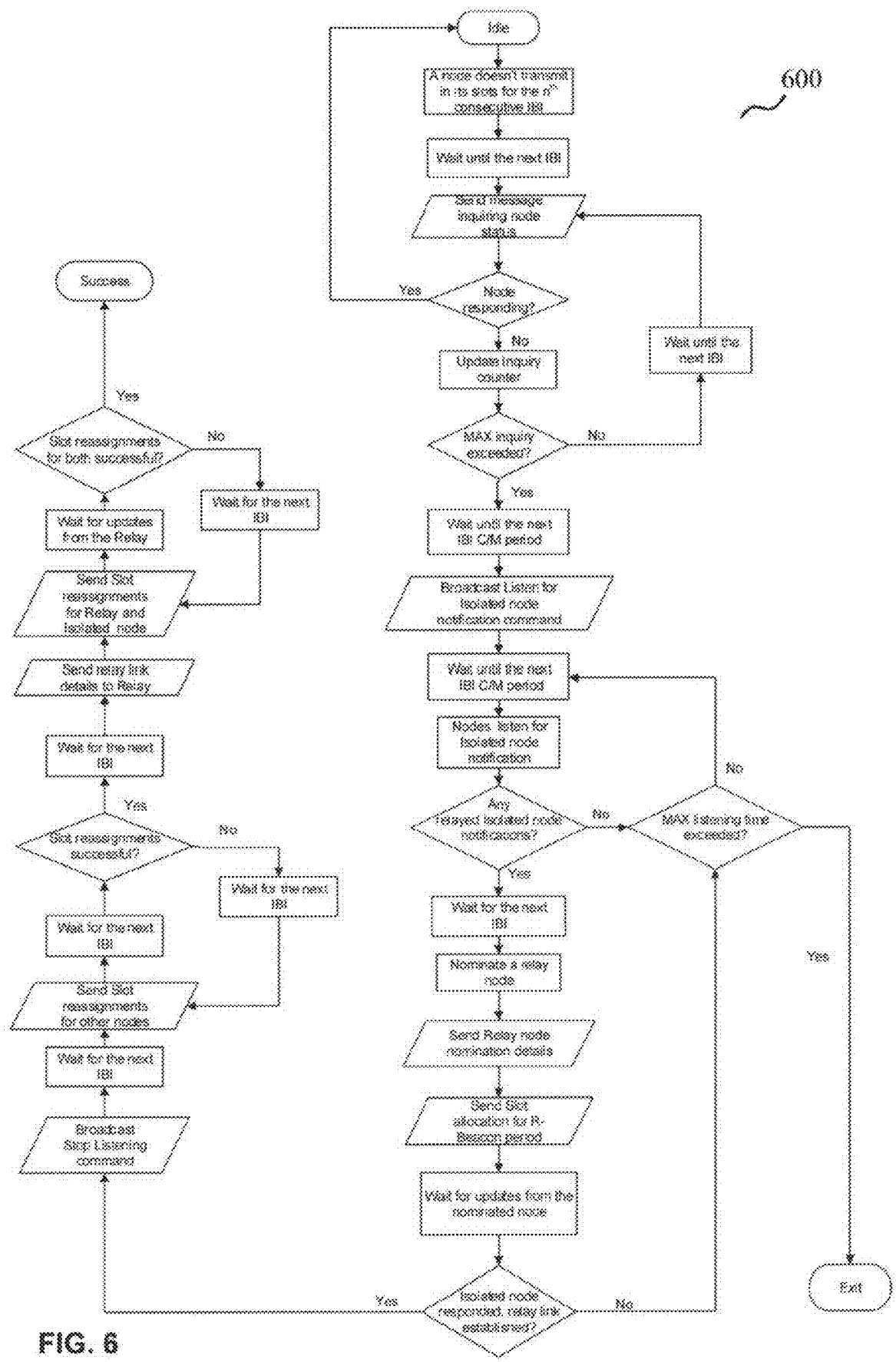
FIG. 6 illustrates relay connectivity establishment flow chart by the Hub, in an embodiment.

The detailed procedure performed during the relay connectivity establishment 300 is illustrated in FIG. 3, in an embodiment of the present invention. Whereas, the message sequence chart, flow chart of the Isolated node, and flow chart of the Hub showing the procedures performed during the relay connectivity establishment are shown in FIG. 4, FIG. 5, and FIG. 6, respectively. All these figures also represent merely embodiments of the present invention.

FIG. 4 thus illustrates notification/message transmissions and receptions between an isolated node 401, a relay 402, a hub 403 and other nodes 404. The transmission and reception steps of FIG. 4 are already present in the above list of steps 1-15, but the messages are also discussed later in detail.

FIG. 5 thus illustrates steps performed by an Isolated node as a flow chart 500. The steps are discussed later in detail.

FIG. 6 thus illustrates steps performed by the Hub as a flow chart 600. The steps are discussed later in detail.

First, maintaining relay connectivity is discussed, in an embodiment of the invention. FIG. 2 is at first referred to.

At first, the Isolated node receives R-Beacons during the R-Beacon period 202 and gets updates about the network resources, upcoming downlink data and slot reassignments etc. The slots allocated for the Isolated node 203 are divided into two equal groups. In the first group of slots, the Isolated node transmits its data to the Relay; and the Relay uses the second group of slots to deliver the Isolated node data to the Hub. The Isolated node can also send data, control and management frames during the C/M period 206 by using the same procedure. Then, the Relay transmits its own data only during its own slots 204 or during the C/M period 206. While getting the relay access to the WBAN through the Relay, the Isolated node continues to listen for a D-Beacon 201 from the Hub, and if it receives one, it starts counting for up to three consecutive D-Beacons and then it terminates the relay access after completing any already started tasks.

In an embodiment, isolated node uplink data can be transmitted either in Isolated node time slots 203 or in Relay own slots 204, or in both.

Secondly, ending relay connectivity is discussed, in an embodiment of the invention.

The relay disconnection can be initiated by the Isolated node, the Relay, or by the Hub. The Isolated node initiates the disconnection request by sending a disconnection frame with a null payload frame. The 'Disconnection Request' frame and the corresponding 'Disconnection Response' frame shall be same as those defined in the SmartBAN standard. The Relay can invoke the disconnection by sending a disconnection command to both the Isolated node and the Hub. The relay connection can be disconnected if one of them approves the disconnection request, in an embodiment. In another embodiment, it is possible to just disconnect the relay connection after the Disconnection Request made by the (nominated) Relay; without any approvals by the Hub or by the Isolated node. For the disconnection initiation purposes, the Relay sends 'Disconnection Request' and 'Relay Disconnection Request' command frames to the Isolated node and to the Hub, respectively. The 'Disconnection Response' frame formats for both are defined in the SmartBAN standard. In doing so, the Hub removes allocated time slots for the R-Beacon period 202 and for the Isolated node 203. The Hub can also initiate a disconnection request by sending a 'Relay Disconnection Request' frame to the Relay. In this last case, the Relay needs to accept this request in order to make the disconnection happen, in an embodiment. However, in another embodiment, the Relay connection can be disconnected directly after the Hub has sent the 'Relay Disconnection Request' frame to the (nominated) Relay.

Next, the types of possible frames in connection with several embodiments of the present invention are discussed. Such examples of frame structures are illustrated in the following Tables 1-18, corresponding to FIGS. 7-24.

Table 1 (i.e. FIG. 7) and the 'Relay connection' subframe in Table 2 (i.e. FIG. 8) are defined mainly to enable the relay functionality. Under the 'Relay connection' subframe, several subframes are defined to support specific relay-related operations and they are formatted as Information Units (IU), as in standard [3]. The IU used in the present invention is formatted as in Table 3 (i.e. FIG. 9). Each operation requiring an IU shall use an appropriate Element ID 901 from the list given in Table 4 (i.e. FIG. 10). In Table 3 of FIG. 9, the Length 902 field denotes the number of Information Module (IM) 903 fields in each IU, and the IM 903 field contains operation specific information and has a length of $L_{IM}$. In the present invention, there can be as many as 16 (=$2^4$) IM 903 fields in each IU.

In the next paragraphs, various frame formats are illustrated through examples shown in FIGS. 11-24 (corresponding to Tables 5-18), and the disclosure below. In these sections, each of the new IUs used in the relay connectivity are discussed as follows, and they represent merely embodiments within the present invention.

Isolated Node Notification (I-Notif) frame is first discussed, see Table 5 in FIG. 11.

This IU consists of at least 1 IM (i.e. Information Module), whose format is shown in Table 5 of FIG. 11.

For the Isolated node—Relay link, the Isolated node broadcasts the Isolated Node Notification frame to the WBAN. So, the Recipient ID is '11111111'.

For the Relay—Hub link, applying the above frame structure, all nodes which have received the Isolated Node Notification frame relay it to the Hub, where the Recipient ID will be the Hub ID and the Sender ID will be the candidate relay Node ID.

Node Status Request (N-Sreq) frame is secondly discussed, see Table 6 in FIG. 12.

This frame is transmitted by the Hub to inquire the status of a node. It is transmitted to a target node which the Hub thinks is experiencing a connection problem. The frame format is a null frame, i.e., the MAC frame body is null, and the corresponding IM is defined in Table 6 of FIG. 12.

Isolated Node Notification Listen (I-Listen) frame is thirdly discussed, see Table 7 in FIG. 13.

When a certain node experiences isolation from the network, the Hub broadcasts an Isolated Node Notification Listen command to the network to initiate the establishment of a relay connectivity for the Isolated node. The corresponding IM format is illustrated in Table 7 of FIG. 13. In Table 7, Node ID subfield represents Isolated node ID. Listen Start Timing subfield denotes the sequence number of the D-Beacon at which the nodes will start listening in the C/M Period. Listen End Timing subfield denotes the sequence number of the D-Beacon at which the nodes will stop listening for an Isolated Node Notification in the C/M Period.

Relay Nomination (R-Nom) frame is fourthly discussed, see Table 8 in FIG. 14.

Once the Hub receives at least one relayed Isolated Node Notification frames, it nominates a candidate relay node and applies the Relay Nomination frame to send information to the chosen node about the proposed relay connectivity. The corresponding IM format is given in Table 8 of FIG. 14. In Table 8, Isolated Node ID subfield represents the Isolated node ID. R-Beacon Start Timing subfield represents the sequence number of the D-Beacon at which the Relay begins transmitting R-Beacons to the Isolated node.

Referring to the previous paragraph, in just one possible example of the present invention, the nomination of the relay node 402 can be made by the hub 104, 403 according to a first temporally received message from the candidate relay nodes. However, many other options are possible as well.

Proposed Relay Link Status (R-Status) frame is fifthly discussed, see Tables 9 and 10 in FIGS. 15 and 16.

The Relay uses the Proposed Relay Link Status IU, whose IM format is shown in Table 9 of FIG. 15, to send updates about the proposed relay link to the Hub.

In Table 9 of FIG. 15, the Relay Link Status subfield describes the status of the proposed relay connection. The bits layout of the IM is indicated in Table 10 of FIG. 16. If bit b1 is set to 1, the connection is successful; otherwise the connection is unsuccessful.

Stop Isolated Node Listening (S-Listen) frame is sixthly discussed, see Table 11 in FIG. 17.

Once the Hub receives the Proposed Relay Link Status frame with the Relay Link Status bit set to 1, it broadcasts the S-Listen frame so that the nodes can stop listening Isolated Node Notifications from the Isolated node, and its IM is given in Table 11 of FIG. 17. In there, Node ID subfield represents Isolated node ID. Stop Listening Timing subfield represents the sequence number of the D-Beacon.

Slot Reassignment (S-Ras) frame is seventhly discussed, see Tables 12 and 13 in FIGS. 18 and 19.

A Slot Reassignment IM has the following fields according to standard [3], see Table 12 of FIG. 18.

In the Relay-enabled scenario, slots reassignment is made for two purposes: for the R-Beacon transmission period and for the actual data transmissions of the Isolated node and the Relay. The R-Beacon slot allocation and slot reassignments for other nodes in the network are made using the IM definition given in Table 12 of FIG. 18. In the R-Beacon case, the Relay transmits the R-Beacon to the Isolated node during its period and thus, the Relay ID is utilized in the Node ID field of the IM.

For the slot reassignments of the Isolated node and the Relay, each Slot Reassignment Frame shall have at least three IMs as illustrated in Table 13 of FIG. 19.

Relay Connection (R-Conn) frame is eighthly discussed, see Table 14 in FIG. 20.

The Hub transmits this IU, whose IM field format is shown in Table 14 of FIG. 20, to the Relay to inform it about the time when the Relay begins acting as a relay between the Hub and the Isolated node.

In Table 14 of FIG. 20, Isolated Node ID subfield denotes the Isolated node ID. Relay Start Timing subfield denotes the sequence number of the D-Beacon at which the relay connectivity begins.

Isolated Node Slot Reassignment ACK (I-SAck) frame is ninthly discussed, see Tables 15 and 16 in FIGS. 21 and 22.

The Isolated node applies this Information Unit to acknowledge the new slot allocation, and the corresponding IM fields are shown in Table 15 of FIG. 21. This IU is transmitted to the Relay during the C/M period.

In table 15 of FIG. 21, the Slot Reassignment subfield indicates the type of acknowledgement for the slot reassignment made. The bits layout of the IM is indicated in Table 16 of FIG. 22. If bit b1 is set to 1, slot reassignment is successful, otherwise there is no slot reassignment ACK.

Finally, Relay Disconnection Request (R-Dreq) is tenthly discussed, see Tables 17 and 18 in FIGS. 23 and 24.

The IM format defined for this frame is indicated in Table 17 of FIG. 23. In there, the Reason subfield of the IM describes the reason for the relay disconnection request and specifies 256 (=$2^8$) different Relay Disconnection Request reasons, in an embodiment. Some of the possible reasons for a relay disconnection are listed in Table 18 of FIG. 24.

Although the present invention above is discussed through WBAN nodes, hubs and sensors, the present invention could be applied in any Wireless Sensor Network ("WSN") in a more general way. In an embodiment, the presented algorithm could be applied in a wireless network in general.

The presented method (i.e. algorithm or mechanism) according to the present invention provides the following advantages over the prior art methods. The method according to the present invention utilizes low complexity MAC specifications.

Furthermore, it is defined specifically to enable relay connectivity in cases of node isolation in wireless networks. The present invention comprises a method to discover isolated nodes in the network. It comprises a method to initiate, establish and maintain relay connectivity in the network. It enables relay connectivity by solely using available network resources without interrupting the ongoing network operations. This is a major advantage of the present invention.

The present invention can be implemented as a piece of software in the WBAN system, where the software can be executed in a controller applying the method steps discussed above. The software, i.e. the computer program(s), can be implemented as a single or several computer programs saved in a memory of a device, which is a part of the system. Of course, the software may be stored fully or partly in an external server or in a cloud service from where it can be transferred to be executed by the controller, i.e. processor, of the WBAN system.

The present invention is not restricted to the embodiments disclosed above but the present invention may vary within the scope of the claims.

The invention claimed is:

1. A method for connecting an isolated node or a node with a connection problem back to a connected state in a wireless network, wherein the method comprises the steps of:
   determining from lack of acknowledgement for a downlink data signal sent by a hub that a respective node is isolated or experiencing a connection problem;
   broadcasting an Isolated Node Notification Listen command by the hub to all connected nodes, thus triggering active listening by at least a portion of the connected nodes for a broadcast Isolated Node Notification originating from the isolated node;
   broadcasting Isolated Node Notifications to the wireless network by the isolated node;
   sending a received Isolated Node Notification by a candidate relay node to the hub;
   nominating a relay node by the hub based on messages received from at least one candidate relay node;
   sending slot allocation for a Relay Beacon, R-Beacon, from the hub to the nominated relay node;
   acknowledging the slot allocation for the R-Beacon by the nominated relay node to the hub;
   transmitting the R-Beacon by the nominated relay node to the isolated node; and
   acknowledging the received R-Beacon by the isolated node to the nominated relay node, resulting in a connection of the isolated node back to the wireless network.

2. The method according to claim 1, wherein the Isolated Node Notifications are broadcast in every N:th Inter-Beacon-Interval, IBI; until a response is received from a candidate relay node, wherein N is a positive integer.

3. The method according to claim 2, wherein N is equal to five.

4. The method according to claim 1, wherein after the isolated node has acknowledged the received R-Beacon,
   sending a Proposed Relay Link Status, R-Status, frame from the nominated relay node to the hub; and
   sending a Stop Isolated Node Listening, S-Listen, command by the hub to all the connected nodes.

5. The method according to claim 1, wherein after the isolated node has acknowledged the received R-Beacon,
   stopping broadcast of the Isolated Node Notifications by the isolated node.

6. The method according to claim 4, wherein after the last step,
   the hub sends slot reassignments for other nodes of the wireless network in order to enable the nominated relay node connectivity;
   the hub sends to the nominated relay node slot reassignments concerning the connection between the nominated relay node and the isolated node and the connection between the nominated relay node and the hub;
   acknowledging by the isolated node for the slot reassignments, to the nominated relay node; and
   sending the acknowledgement from the nominated relay node to the hub.

7. The method according to claim 1, wherein if the hub receives an Isolated Node Notification directly from the isolated node,
   sending a D-Beacon by the hub to the wireless network, resulting in reconnection of the isolated node into the wireless network.

8. The method according to claim 1, wherein the nomination of the relay node is made by the hub according to a first temporally received message.

9. The method according to claim 1, wherein a superframe structure of the slot reassignments comprise an R-Beacon period, isolated node time slots and relay own slots, consecutively, all locating within a scheduled period between two subsequent D-Beacons.

10. The method according to claim 1, wherein relay connectivity is maintained by performing the steps of:
    transmitting data, by the isolated node, to the nominated relay node in a first group of slots during a scheduled period;
    transmitting the received data, by the nominated relay node, to the hub in a second group of slots during the scheduled period; and
    transmitting own data of the nominated relay node during relay own slots within the scheduled period, or during a Control/Management period.

11. The method according to claim 10, wherein relay connectivity is further maintained by performing the step of:
    transmitting data, and control and management frames, by the isolated node, to the nominated relay node during the Control/Management period.

12. The method according to claim 1, wherein relay connectivity is ended by the isolated node by performing the steps of:
    transmitting a Disconnection Request with a null payload frame; and
    acknowledging, by the nominated relay node, the received Disconnection Request by transmitting a Disconnection Response.

13. The method according to claim 1, wherein relay connectivity is ended by the nominated relay node by performing the steps of:
    transmitting a Relay Disconnection Request, R-Dreq, to the hub;
    transmitting a Disconnection Request to the isolated node; and
    disconnecting the relay connection.

14. The method according to claim 1, wherein relay connectivity is ended by the hub by performing the steps of:
- transmitting a Relay Disconnection Request, R-Dreq, to the nominated relay node; and
- accepting, by the nominated relay node, the received Relay Disconnection Request.

15. The method according to claim 1, wherein the wireless network is a Wireless Body Area Network, WBAN.

16. An isolated node, wherein, when the isolated node is determined to lack connection to a wireless network, the isolated node is configured to perform the steps of:
- broadcasting Isolated Node Notifications to the wireless network;
- receiving a Relay Beacon, R-Beacon, from a nominated relay node; and
- acknowledging the received R-Beacon by the isolated node to the nominated relay node, resulting in a connection of the isolated node back to the wireless network.

17. A hub, wherein, when an isolated node is determined to lack connection to a wireless network, the hub is configured to perform the steps of:
- broadcasting an Isolated Node Notification Listen command to all connected nodes, thus triggering active listening by at least a portion of the connected nodes for a broadcast Isolated Node Notification originating from the isolated node;
- receiving at least one received Isolated Node Notification from at least one candidate relay node;
- nominating a relay node based on messages received from the at least one candidate relay node;
- sending slot allocation for a Relay Beacon, R-Beacon, to the nominated relay node; and
- receiving acknowledgement of received slot allocation for the R-Beacon from the nominated relay node.

18. A relay node, wherein, when an isolated node is determined to lack connection to a wireless network, the relay node is configured to perform the steps of:
- receiving an Isolated Node Notification Listen command from the hub;
- listening to broadcast Isolated Node Notifications from the isolated node;
- sending a received Isolated Node Notification to the hub;
- receiving a nomination for a nominated relay node from the hub;
- receiving slot allocation for a Relay Beacon, R-Beacon, from the hub;
- acknowledging received slot allocation for the R-Beacon to the hub;
- transmitting the R-Beacon to the isolated node; and
- receiving acknowledgement of the received R-Beacon from the isolated node, resulting in a connection of the isolated node back to the wireless network.

19. A computer program product for connecting an isolated node or a node with a connection problem back to a connected state in a wireless network, the computer program product comprising program code executable in a processor, wherein when executed, the computer program product is configured to perform the steps of:
- determining from lack of acknowledgement for a downlink data signal sent by a hub that a respective node is isolated or experiencing a connection problem;
- broadcasting an Isolated Node Notification Listen command by the hub to all connected nodes, thus triggering active listening by at least a portion of the connected nodes for a broadcast Isolated Node Notification originating from the isolated node;
- broadcasting Isolated Node Notifications to the wireless network by the isolated node;
- sending a received Isolated Node Notification by a candidate relay node to the hub;
- nominating a relay node by the hub based on messages received from at least one candidate relay node;
- sending slot allocation for a Relay Beacon, R-Beacon, from the hub to the nominated relay node;
- acknowledging the slot allocation for the R-Beacon by the nominated relay node to the hub;
- transmitting the R-Beacon by the nominated relay node to the isolated node; and
- acknowledging the received R-Beacon by the isolated node to the nominated relay node, resulting in a connection of the isolated node back to the wireless network.

\* \* \* \* \*